Patented Sept. 16, 1941

2,255,815

UNITED STATES PATENT OFFICE 2,255,815

PRODUCTION OF 7-DEHYDRO-STEROIDS

Hans R. Rosenberg, Wilmington, Del., and Theophilus Parsons, Jr., New Brunswick, N. J., assignors to E. I. du Pont de Nemours & Company, Wilmington, Del., a corporation of Delaware No Drawing. Application July 7, 1939,
Serial No. 283,294

19 Claims. (Cl. 260—397.2)

This invention relates to the production of provitamins, and especially provitamin D. More particularly it relates to the production of double unsaturated steroids, characterized by having two conjugated double bonds in ring II of the cyclo-pentano-perhydro-phenanthrene skeleton. Still more particularly it relates to the production of 7-dehydro-sterol compounds, especially 7-dehydro-cholesterol.

It is known that certain 7-dehydro-sterol compounds are valuable provitamins. For example, 7-dehydro-cholesterol, 7-dehydro-stigmasterol, 7-dehydro-sitosterol, ergosterol and certain of their derivatives may be antirachitically activated to produce vitamin D.

The aforesaid and related 7-dehydro-sterols may be obtained by chemical synthesis involving the thermal decomposition of certain esterified 7-hydroxy-sterols. An illustration of this reaction is the thermal decomposition of 7-hydroxy-cholesterol-dibenzoate, 7-hydroxy-stigmasterol-dibenzoate and 7-hydroxy-sitosterol-dibenzoate, which is described in U. S. Patent No. 2,098,984. The aforesaid reactions are subject to many disadvantages, among which are the difficulty of controlling the reaction, the production of undesirable by-products, the difficulty of treating a large quantity of materials, the relatively few types of esters which are susceptible to it, etc.

It is an object of this invention to provide an efficient method for the production of provitamines which overcomes the aforementioned disadvantages of the prior art processes. A further object is to produce 7-dehydrosterols by a satisfactory chemical process involving simple steps and readily available reagents. Still further object is to produce 7-dehydrosterols in increased yields utilizing economical reagent materials. Additional objects will appear hereinafter or become apparent from a consideration of the following specification and claims.

The above and other objects are accomplished in accordance with the present invention wherein a steroid characterized by having an esterified hydroxyl group in the 7-position and a double bond in the 5,6-position of a cyclo-pentano-perhydro-phenanthrene nucleus is reacted with an organic oxonium salt forming compound whereby an acid group is split off. The reaction may be carried out in the presence of organic nitrogen containing bases, ammonia, metal oxides or salts which have a pH in water solution of 4 to 12.

In a more limited sense they are accomplished by reacting esters of 7-hydroxy sterols with organic oxonium salt forming compounds until one acid group is split off from the 7-position. The resulting compound is then saponified to form a sterol containing a conjugated double bond in ring II of the cyclo-pentano-perhydro-phenanthrene nucleus.

According to a further embodiment of the invention steroids of the type herein specified are reacted with an oxonium salt-forming compound in the presence of an assisting agent such as organic nitrogen containing bases, especially organic amines, ammonia, metal oxides or salts which have a pH in water of 4 to 12; whereby enhanced effects are obtained.

The analogous sulfur compounds which are sulfonium salt forming compounds do not give the same results as the oxonium salt forming compound. Small amounts of free acid convert 7-hydroxy-cholesteryl-dibenzoate, 7-hydroxy-cholesteryl-3-monobenzoate and 7-hydroxy-cholesterol into compounds which are different from the mentioned compounds.

A large number of oxonium salt forming compounds may be used in accordance with the invention. It is preferred that the reaction be carried out in a homogeneous liquid phase. Suitable compounds include ethers, alcohols, ketones, aldehydes, esters, etc. The compounds may be aliphatic, cycloaliphatic, aromatic, heterocyclic, or mixed compounds of the type specified. The particular compound chosen, however, should not destroy Δ-5,7-steroid compounds. In order to find out if a certain oxonium salt forming compound will be suitable and not destroy the double unsaturated steroid compound, the following simple test may be conducted: Two mg. ergosterol (or other similar compound) is heated in the presence of the compound to be tested in the absence of air or a free oxygen-containing gas, preferably in a sealed tube containing an inert medium, e. g. nitrogen or evacuated before sealing, to 200° C. for one hour. The reaction product is diluted with 100 cc. of ethyl alcohol and spectroscopically examined for the presence of the ergosterol. If the ergosterol has remained unchanged the compound is suitable. On the other hand, if the ergosterol is altered or destroyed the compound is not satisfactory.

The normally liquid aliphatic and cyclic ethers, esters and ketones are the preferred types of oxonium salt-forming compounds and of these, dioxane and acetone give the highest yields. It is not necessary, however, to use compounds which contain oxonium salt-forming groups only. Thus, compounds which contain other groups also have utility. The presence of acid binding groups such as amino group in addition to the oxygen give excellent results. Examples of such compounds are ether-amines, e. g. morpholine, phenoxazines, the general group of acid amides and their substitution products, e. g. stearic acid amide, acetanilide, urea, the class of alcohol-amines, such as ethanol-amine, etc., keto-amines, e. g. amino-benzophenone, ester-amines, e. g. amino-acid-esters.

The reaction conditions for each oxonium forming compound vary, of course, with the specific nature of the compound and sterol polyester chosen. In general, temperatures in excess of 100° C. are required and temperatures up to 350° C. may be used. The length of heating has a decided effect on the yield. For example, dioxane and 7-hydroxy cholesteryl dibenzoate in sealed tubes at 200° give in two hours 10–20%, in four hours 70%, in six hours 40%, 7-dehydro cholesteryl benzoate. Similar relations are found for the temperature of the reaction.

The invention is intended to be illustratd but not limited by the following examples in which the parts stated are parts by weight:

Example I

Six and one-tenth grams of 7-hydroxy-cholesteryl dibenzoate, M. P. 172.5–173.5° C. is dissolved in 100 cc. dioxane and heated in an evacuated sealed tube or autoclave to 200° C. for four hours. The reaction product is poured into water and extracted with ether. The ether solution is washed with diluted sodium carbonate, dried over sodium sulfate and distilled to dryness. By repeated recrystallization from acetone, 7-dehydro-cholesteryl-benzoate is obtained, which by saponification is converted into 7-dehydro-cholesterol. Yield—70%.

Example II 7-hydroxy cholesteryl dibenzoate is dissolved in a mixture of dioxane and piperidine (at least one mole) and heated in a sealed tube to 200° C. for two hours. The reaction product is poured into water and extracted with ether. The ether solution is washed with diluted hydrochloric acid, water and diluted sodium hydroxide. A solution of potassium hydroxide in ethyl alcohol is added and the mixture is heated to reflux and the ether is distilled off and part of the ethyl alcohol. The residue, after cooling down to room temperature, is poured into water and extracted with ether. The ether solution is washed neutral and dried. After evaporation of the ether, the 7-hydro-cholesterol crystallizes out and can be recrystallized according to the known methods. Yield—50%.

Example III 7-hydroxy-cholesteryl dibenzoate is dissolved in morpholine and refluxed (temp. 125–130° C.) for five hours. The reaction product contains 60% 7-dehydro-cholesteryl benzoate.

Example IV 7-hydroxy cholesteryl dibenzoate is dissolved in dioxane and a concentrated solution of ammonia in water is added. The mixture is heated to 200° C. for two hours. 7-dehydro-cholesteryl benzoate or 7-dehydro-cholesterol after saponification is obtained in a yield of 30%.

Example V 7-hydroxy-cholesteryl dibenzoate is dissolved in dioxane and one mole of aluminum oxide is added. The mixture is heated to 200° C. and contains after this treatment 30–35% 7-dehydro-cholesteryl benzoate.

Example VI 7-hydroxy-cholesteryl dibenzoate is dissolved in dioxane and a solution of sodium chloride in water, e. g. $\frac{1}{5}$ normal is added in such an amount that per mole of the steroid about one or two mols of sodium chloride is present. The clear solution is heated to 200° C. for two hours, after which time 55–60% of 7-dehydro-cholesteryl benzoate is formed which can be isolated according to the known methods.

Example VII 7-hydroxy cholesteryl dibenzoate is dissolved in dioxane and an equimolecular part of a concentrated sodium phosphate solution in water is added. The mixture is heated to 200° C. for two hours. The reaction product is poured into ether and extracted with water. The ether solution is mixed with a solution of sodium hydroxide in alcohol and refluxed for one hour. The neutral parts of the saponification mass are isolated. About 50% of 7-dehydro-cholesterol is obtained.

As previously mentioned, this invention is understood to be of much broader scope than the aforesaid preferred embodiments and may embrace the treatment of steroids generally wherein a double bond exists in a position adjacent to the esterified hydroxy group in 7-position, regardless of whether additional substituents are also present in other positions in the molecule. Any ester compound having the cyclo-pentano-perhydro-phenanthrene skeleton may be used. Such substances are sometimes termed steroid or sterid compounds and include those having the nucleus referred to with or without side chains including said chains with other functional groups such as oxo, hydroxy and carboxyl groups and their derivatives. Thus, the term "steroids" includes not only sterols, but also bile acids, plant heart poisons, saponines and sex hormones. While all of the preceding examples are directed to the treatment of 7-hydroxy-cholesteryl dibenzoate, it is applicable to 7-hydroxy-sterol esters in general. Suitable polyesters of the above-described types include 7-hydroxy-sitosteryl diesters, 7-hydroxy stigmasterol diester, 3,7-dihydroxy-5-cholenic acid esters, Δ 5-androstentriol-3,7,17-triesters, and the corresponding esters of the pregnane series. Suitable esters include the simple or mixed carboxylic esters of 7-hydroxy sterol compounds prepared from acids such as nitrobenzoic, m-dinitrobenzoic, chlorobenzoic, toluic, phenylacetic, cinnamic, formic, propionic, butyric, valeric, etc. acids, acid anhydrides and acid halides, e. g. acyl chlorides. Any of the diesters disclosed in Rosenberg application, Serial No. 228,219, filed September 2, 1938 now U. S. Patent 2,209,934, and Rosenberg and Tinker application, Serial No. 228,220, filed September 2, 1938 now U. S. Patent 2,215,727, may be used as starting materials in the present processes.

As examples of additional suitable oxonium salt-forming ethers, mention is made of dimethyl ether, diethyl ether, isopropyl ether, dibutyl ether, diphenyl ether, anisol, phenetol, dodecyl ether, the dodecyl ether of resorcinol; as examples of esters, mention is made of ethylacetate, isoamyl-butyrate, ethylpropionate, cetylacetate, ethyl malonate, octylacetate, cetylpalmitate, ethylbenzoate, cyclohexylbutyrate, etc.; as additional examples of ketones and aldehydes, mention is made of acetone, methyl-ethyl ketone, pentanone-3, butanone, n-hexanone, mesityl oxide, methyl-nonyl ketone, acetaldehyde, formaldehyde, propionaldehyde, benzaldehyde, etc.; suitable alcohols include methanol, ethanol, isopropanol, octanol, dodecanol, hexanol-3, cyclohexyl alcohol, benzyl alcohol, etc. The mentioned compounds are merely representative of a large number of other specific compounds which may be used. The use of the oxonium salt-forming compounds just described is exemplified by the following comparative yields with 7-hydroxy-cholesteryl dibenzoate at 200° C. for two hours which have been determined spectroscopically, dioxane 10–20%, acetone 26–29%, ethyl acetate 13–15%, dibutyl ether 5–7%, and ethyl alcohol 1–2%.

The oxonium salt-forming compounds may be used over a wide range of concentration. In general, it is desirable to have at least one mol of the compound for each acid group which is removed. The amount of assistant may likewise be varied over a wide range. In general, one mol of salt, metal oxide or organic base is used for each mol of oxonium compound. An excess of oxonium compound is desirable per acid group.

As above stated, organic nitrogen bases may be used in admixture with the organic oxonium salt forming compound. A wide variety of such bases may be used with satisfactory results. Bases which are of particular value are organic mono-, di- and poly-amines of either primary, secondary or tertiary character. They may be simple or mixed aliphatic, aromatic, cycloaliphatic or heterocyclic. Amines which have a dissociation constant between $10^{-2}$ and $10^{-14}$ work very favorably in the reaction. Mixtures of such amines may be used.

As examples of suitable nitrogen containing bases which may be used in conjunction with the oxonium salt forming compounds are:

Aniline
Pyridine
Piperazine
Piperidine
Dimethyl-aniline
Diethyl-aniline
Diethyl-a-naphthylamine
Diethylamino-cyclohexylamine
Dimethyl-stearylamine
Methyl-undecylamine
Mono-ethyl-aniline
Quinoline
Triethylamine
Ammonia The following table of results shows the advantages of using a nitrogen base, at 200° C. for two hours.

| | Per cent |
|---|---|
| Dioxane | 10–20 |
| Dioxane+piperazine | 25 |
| Dioxane+piperidine | 45–50 |
| Dioxane+urea | 40 |
| Dioxane+acetanilide | 35–37 |
| Dioxane+ammonia | 30 |

Metal oxides as stated above have a beneficial effect on the yield. For example, the yield of 7-dehydro-cholesteryl benzoate from 7-hydroxy-cholesteryl dibenzoate is raised from 10–20% to 30–35% by the addition of aluminum oxide. Additional suitable compounds include boron, iron, nickel, vanadium, chromium, copper, osmium, zinc, mercury, silicon and lead oxides.

Salts which have a pH within 4 and 12 inclusive in water solution produce increased yields when used in conjunction with the oxonium salt forming compounds. The following table embraces representative useful salts which are weakly acid, neutral or weakly basic, and shows the increased yields obtained by their use. 7-hydroxy cholesteryl dibenzoate was the compound tested in each instance, at 200° C. for two hours.

| Compound | Yield |
|---|---|
| | Percent |
| Dioxane alone | 10–20 |
| Dioxane with $NaH_2PO_4$ | 30–32 |
| Dioxane with $Na_2SO_4$ | 42–47 |
| Dioxane with $MgSO_4$ | 25–30 |
| Dioxane with NaCl | 55–60 |
| Dioxane with Na acetate | 56–62 |
| Dioxane with $NaHCO_3$ | 68–70 |
| Dioxane with $Na_2CO_3$ | 52–57 |
| Dioxane with $Na_3PO_4$ | 45–50 |
| Dioxane with $Na_3AsO_4$ | 65 |

The 7-dehydrosteryl compounds which contain an ester group in the 3-position may be saponified in the usual manner, for instance, by means of alkali in alcoholic solution. Caustic, alkali and alkaline-earth metal hydroxides may be employed as the saponifying agents.

The present processes of splitting organic acids from esters of sterol compounds which contain a double bond in the 5,6- or α, β-position to an ester group in ring II of a cyclo pentano perhydro phenanthrene nucleus are of considerable importance because increased yields of the corresponding sterol compounds which are of peculiar physiological importance, may be readily obtained without increased expense.

A further advantage resides in the fact that the present invention is of general application, whereas prior art processes are limited in their application to a relatively small number of esters.

As many apparently widely different embodiments of this invention may be made without departing from the spirit and scope thereof it is to be understood that we do not limit ourselves to the specific embodiments herein except as defined by the appended claims.

We claim:

1. The process which comprises reacting a steroid characterized by having an esterified hydroxyl group in the 7-position and a double bond in the 5,6-position of a cyclo-pentano-perhydro-phenanthrene nucleus with an additional non-acidic oxonium salt forming compound.

2. The process which comprises reacting a steroid characterized by having an esterified hydroxyl group in the 7-position and a double bond in the 5,6-position of a cyclo-pentano-perhydro-phenanthrene nucleus with an additional non-acidic organic oxonium salt forming compound.

3. In a process for producing 7-dehydro-sterols, the step which comprises reacting an esterified 7-hydroxy-sterol with an additional non-acidic organic oxonium salt-forming compound.

4. The process which comprises reacting a steroid characterized by having an esterified hydroxyl group in the 7-position and a double bond in the 5,6-position of a cyclo-pentano-perhydro-phenanthrene nucleus with an additional non-acidic oxonium salt forming compound in the presence of at least one assisting agent selected from the group consisting of inorganic salts which have a pH in water solution of 4 to 12, nitrogen-containing bases and metal oxides.

5. The process which comprises reacting an esterified 7-hydroxy-sterol with an additional non-acidic oxonium salt forming compound in the presence of a nitrogen base.

6. The process which comprises reacting an esterified 7-hydroxy-sterol with an additional non-acidic oxonium salt forming compound in the presence of an organic nitrogen base.

7. The process which comprises reacting an esterified 7-hydroxy-sterol with an additional non-acidic oxonium salt forming compound in the presence of an organic amine.

8. The process which comprises reacting an esterified 7-hydroxy-sterol with a non-acidic oxonium salt forming ether in the presence of an organic nitrogen base having a dissociation constant between $10^{-2}$ and $10^{-14}$, at a temperature between 100 and 300° C.

9. The process which comprises reacting an esterified 7-hydroxy-sterol with an additional non-acidic oxonium salt forming compound in the presence of a metal oxide.

10. The process which comprises reacting an esterified 7-hydroxy-sterol with an additional non-acidic oxonium salt forming compound in the presence of an inorganic metal salt which has a pH in water solution of 4 to 12.

11. The process which comprises reacting a 7-hydroxy-cholesterol carboxylic acid ester with an additional non-acidic oxonium salt forming compound until a 7-dehydro-cholesterol compound is formed.

12. In a process for producing 7-dehydro-sterols, the step which comprises reacting an esterified 7-hydroxy-sterol with an additional non-acidic salt-forming compound while heating said components to a temperature from 100° to 350° C.

13. In a process for producing 7-dehydro-sterols, the step which comprises reacting an esterified 7-hydroxy-sterol with at least one mol of an additional non-acidic salt-forming compound per mol of said sterol while heating said components to a temperature from 100° to 350° C.

14. The process which comprises reacting an esterified 7-hydroxy-sterol with an additional non-acidic oxonium salt-forming alcohol.

15. The process which comprises reacting an esterified 7-hydroxy-sterol with an additional non-acidic oxonium salt-forming carboxylic acid ester.

16. The process which comprises reacting a diester of a 7-hydroxy-sterol and a monobasic carboxylic acid, with an additional non-acidic oxonium salt-forming compound while heating said components to a temperature from 100° C. to 350° C.

17. The process which comprises reacting a diester of a 7-hydroxy-sterol and a monobasic carboxylic acid, with an additional non-acidic oxonium salt-forming compound while heating said components to a temperature from 100° C. to 350° C. and saponifying the resulting product.

18. The process which comprises reacting 7-hydroxy-cholesteryl dibenzoate with an additional non-acidic oxonium salt-forming compound while heating said components to a temperature from 100° C. to 350° C.

19. The process which comprises reacting a steroid characterized by having an esterified hydroxyl group in the 7-position and a double bond in the 5,6-position of a cyclo-pentano-perhydrophenanthrene nucleus with an additional non-acidic oxonium salt forming compound, and saponifying the resulting product.

HANS R. ROSENBERG.
THEOPHILUS PARSONS, Jr.